United States Patent [19]
Gunn et al.

[11] Patent Number: 5,024,503
[45] Date of Patent: Jun. 18, 1991

[54] HERMETIC GLAND FOR OPTICAL FIBRES

[75] Inventors: Duncan A. Gunn, Widdington; Stephen J. McManus, Bishop's Stortford, both of Great Britain

[73] Assignee: STC PLC, London, England

[21] Appl. No.: 479,119

[22] Filed: Feb. 13, 1990

[30] Foreign Application Priority Data

Feb. 16, 1989 [GB] United Kingdom ............ 8903560.4

[51] Int. Cl.$^5$ .............................................. G02B 6/36
[52] U.S. Cl. .................................................. 350/96.20
[58] Field of Search ................ 350/96.20, 96.21, 96.22

[56] References Cited

U.S. PATENT DOCUMENTS

| | | | |
|---|---|---|---|
| 3,825,320 | 7/1974 | Redfern | 350/96.22 |
| 4,312,563 | 1/1982 | Mead | 350/96.20 |
| 4,505,540 | 3/1985 | Furusawa et al. | 350/96.20 |
| 4,653,846 | 3/1987 | Yamazaki et al. | 350/96.20 |
| 4,662,002 | 4/1987 | Davis et al. | 350/96.20 X |
| 4,759,601 | 7/1988 | Knutsen et al. | 350/96.21 |
| 4,834,479 | 5/1989 | Adl | 350/96.20 |
| 4,891,640 | 1/1990 | Ip | 350/96.20 X |

Primary Examiner—John D. Lee
Attorney, Agent, or Firm—Lee, Mann, Smith, McWilliams & Sweeney

[57] ABSTRACT

An optical fibre gland for a submerged repeater comprising an insulating body (1) having a bore (4) accommodating a pressure tube (5). A high pressure end fitting (8) is secured to the tube and the body and a low pressure end fitting (12) is secured only to the tube. The tube and fibres are water and gas blocked and the construction is such as to enable the gland to operate satisfactorily over a wide temperature range.

10 Claims, 4 Drawing Sheets

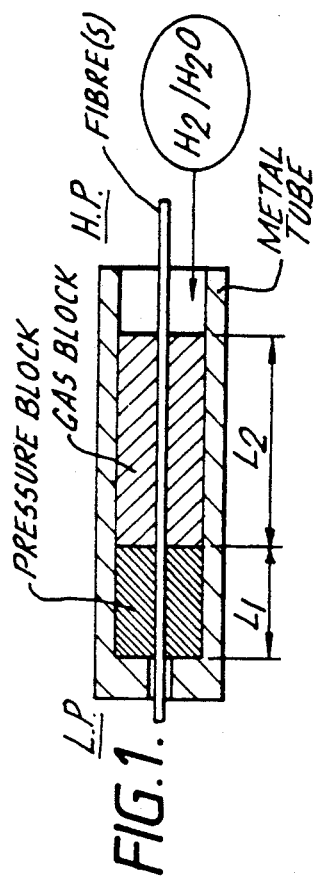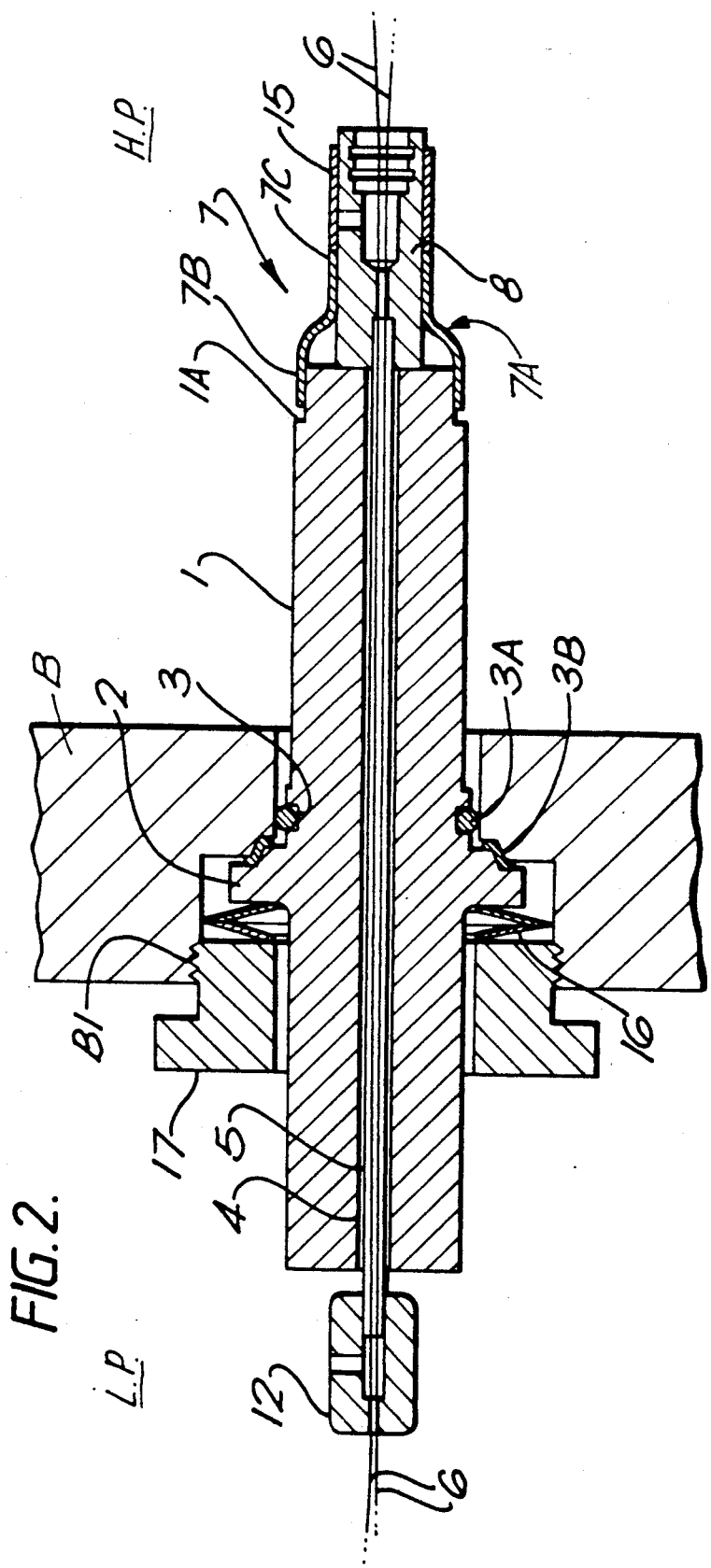

HERMETIC GLAND FOR OPTICAL FIBRES

BACKGROUND OF THE INVENTION

1) Field of the Invention

This invention relates to an hermetic high-pressure-resistant gland for optical fibres and has particular but not exclusive application for submerged repeaters for a submarine telecommunications link.

2) Discussion of the Prior Art

Our British patent 2153169 (Gunn 10-6-1-1) describes a high pressure gland for optical fibres and/or electrical conductors for use in a submerged repeater. FIG. 1 of that patent describes a water blocking cable entry extending through a main bulkhead. Within the repeater housing and protected from water by the main bulkhead and the cable entry are individual optical fibre glands described in FIGS. 2 and 4. The main purpose of these individual glands is for gas blocking to ensure gas e.g. Hydrogen does not enter the regenerator compartment of the repeater.

Other patent publications which describe various forms of fibre feed-through glands are 2137375A, 2191871A, 2187304A, Euro 0274222 and U.S. Pat. No. 4,345,816. All these prior art glands rely on an adhesive bond between the bare fibre and a surrounding casing to achieve the hermetic seal. Either plastics resin material in 2187304 and U.S. Pat. No. 4,345,816, bonding cement in U.S. Pat. No. 2,191,871, solder in U.S. Pat. No. 2137375, and a so-called glass-to-metal seal in Euro 0274222 formed by a glass solder are cited as the materials which are used.

In U.S. Pat. No. 2,137,375 a liquid filler 13 is filled to ensure that if a pressure is applied it is exerted uniformly around the solder. It is claimed that with such an arrangement it is possible to obtain an optical hermetic fixture structure which inhibits the leakage thereinto of sea water and water vapour by virtue of the self-sealing effect which results from the compression of the solder by the liquid filler, even if sea water pressure is applied to the feed-through in case of a cable fault.

These and other fibre gland designs to date have all employed a solid interface technology for hermeticity. For example, soft solder in contact with the metallised fibre and a plated gland body, or a resin or amalgam to seal on coated or stripped fibres.

Two major problems exist using a solid interface. Firstly, due to differing thermal properties, temperature changes result in high mechanical stresses at the interfaces which can eventually lead to bond breakdown so the gas blocking ability is lost. Secondly, any design which requires the protective coatings to be removed from the fibre is likely to cause damage to the fibre. Major damage leading to breaks should be apparent during production testing, but minor undetected damage may result in a later time-dependent failure in service.

It is an object of the present invention to provide a gland design with improved hermeticity and reliability, and in particular to devise a gland which is suitable for conditions of varying temperature and to provide a satisfactory gas block.

SUMMARY OF THE INVENTION

According to the present invention there is provided an hermetic gland for optical fibres comprising a rigid gas-tight member having a passageway from a high pressure end of the gland extending therethrough to a low pressure end of the gland, at least one optical fibre extending into the passageway at the high pressure end and emerging from the passageway at the low pressure end, a gas-blocking grease jelly or similarly viscous liquid material filling said passageway over such length as to provide the required gas blocking property in the passageway of the gland, and a plug in the passageway at the low pressure end whose purpose is to prevent leakage of said gas blocking material from the passageway and to provide the required hydraulic pressure-resisting property within said passageway of the gland.

According to another aspect of the present invention there is provided a submersible repeater for an underwater optical fibre telecommunication system, comprising a pressure-resistant housing, a primary pressure-resistant cable entry gland for an optical fibre submarine cable and a secondary optical fibre gas blocking gland, said gas blocking gland comprising a passageway through which the fibres extend and which has a length substantially greater than its width, said passageway containing a gas blocking grease jelly or similarly viscous liquid material over such a length in the passageway as to act as the gas block for the secondary gland.

BRIEF DESCRIPTION OF THE DRAWINGS

In order that the invention can be clearly understood reference will now be made to the accompanying drawings in which:

FIG. 1 shows diagrammatically the principle of the present invention;

FIG. 2 shows somewhat schematically and in partial cross-section an hermetic gland for optical fibres according to an embodiment of the present invention;

DESCRIPTION OF THE PREFERRED EMBODIMENT

There are two objectives of this new gland design:
1. to avoid the need for fibre stripping;

2. to eliminate thermal stresses at critical sealing interfaces,
and thus ensure long term reliability of operation.

In the new design the gas blocking and pressure resisting functions are separated. The gas blocking function is achieved by using a low permeability, high viscosity liquid that is maintained in intimate contact with the coated fibre and internal surfaces of the gland body, irrespective of changes in temperature.

With the gas performance of the gland largely dictated by the properties of the high viscosity fluid, the separate pressure resisting function becomes a less critical item in terms of leakage performance. Instead of having to seal against the small helium gas molecule the block has only to prevent the leakage of the high viscosity fluid.

Figure 4:
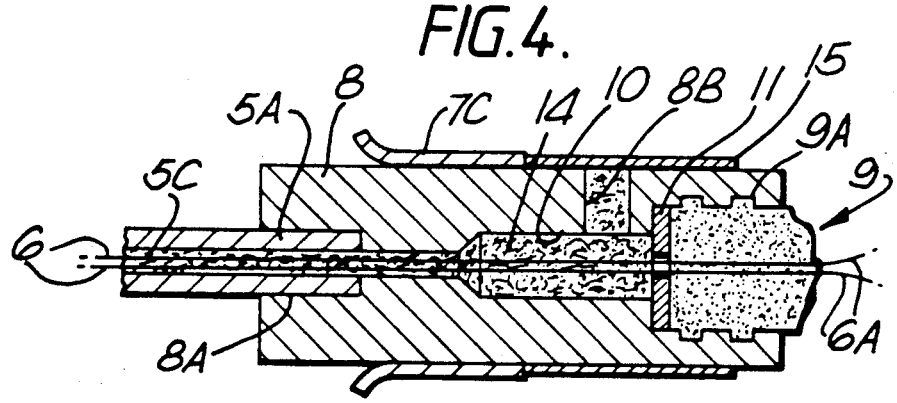
FIG. 4 shows another part of the embodiment of FIG. 2 also on a larger scale.

Referring to FIG. 1 of the drawings the gland comprises an electrically insulating body 1 preferably of ceramic having an annular shoulder 2 and an annular recess 3 both to enable the body to be removably secured in a bulkhead B in a submerged repeater as shown more clearly in FIG. 4 of the drawing. The recess 3 accommodates an O-ring 3A preferably of rubber and a gasket 3B preferably of copper is squeezed between the stepped co-operating faces 2A of the shoulder 2 and 2B of the bulkhead B.

The ceramic body 1 has a bore 4 which accommodates a metallic tube 5 (not shown in FIG. 4), in this embodiment of stainless steel or copper alloy, and the tube 5 is a loose or sliding fit in the bore 4. The tube 5 is designed as a pressure resisting tube able to withstand the hydrostatic pressure prevailing in deep oceans.

Through the tube 5 extends optical fibres 6. The fibres are loose individual fibres and may for example be acrylate coated fibres.

Figure 3:
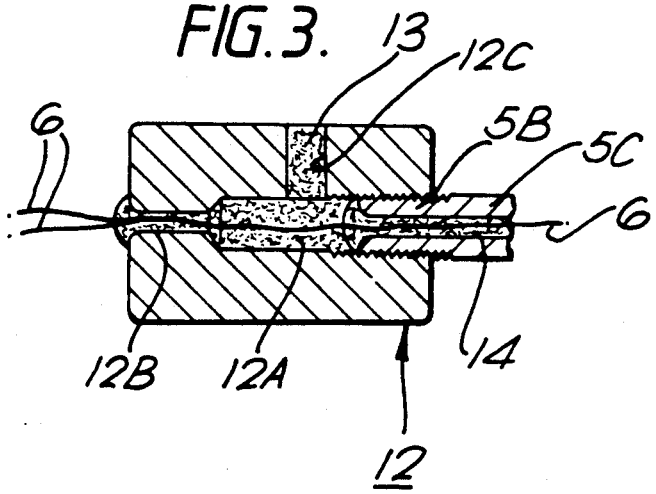
FIG. 3 shows part of the embodiment of FIG. 2 on a larger scale.

At the high pressure (HP) end of the body 1 which is designed to resist the high pressure environment externally of the bulkhead in which the gland is fitted, there is a high pressure seal provided by a high pressure fitting 7 shown in greater detail in FIG. 3.

The high pressure fitting comprises a tubular metallic ring 7A made of Kovar (Registered Trade Mark) which has a larger diameter portion 7B soldered to an end 1A of the body 1 and a smaller diameter portion 7C soldered to a tube 8, made of copper in this embodiment.

The high-pressure end fitting copper tube 8 is held co-axial with the bore 4 of the body 1 by means of the tubular ring 7A and an end portion 5A of the tube 5 fits into a corresponding recess 8A of the tube 8.

The fibre portions 6A are sealed in the high pressure gland by a plug 9 formed by a resin end-fill which is locked into the high pressure-end fitting 8 by means of internal castellated annular corrugations 9A.

The other end, the low pressure (LP) end, of the gland comprises a metal (copper) low pressure end fitting 12 which has a larger internal bore 12A and a smaller bore 12B, an end portion 5B of the tube 5 being located within the bore 12A and held therein by means of a resin end-fill 13 which fills the larger bore 12A and the smaller bore 12B and locks the end portion 5B of the copper tube 5 into the bore 12A of the end fitting 12.

The space between the fibres 6 and the internal passageway or bore 5C of the tube 5 is filled with a viscous gas blocking material 14. The main purpose of the material 14 is to restrict the permeation of gas by maintaining intimate contact between the tube 5 and the fibres 6 irrespective of temperature variations causing differential thermal expansion between tube and fibres. In this embodiment a gas blocking compound sold under the trade name HYVIS is used, although there maybe other suitable gas blocking grease, jelly or similarly viscous liquid gas blocking materials.

The method of assembly is as follows: with fibres 6 in the tube the plug 9 is formed and cured at the HP end by a resin end-fill which is prevented from entering the inner chamber 10 by means of the washer 11 made in this embodiment of PTFE.

The gas blocking material 14 is then injected through the port 8B at the HP end to completely fill the tube 5. High-viscosity compound may be heated to facilitate filling. After filling a simple rubber or plastic sleeve 15 is fitted to seal the filling port 8B.

The LP end fitting 12 is then screwed (a portion of bore 12A is screw threaded) to the threaded LP end of 5B of the tube 5 and a second epoxy plug 13 is formed, again by injection through a port 12C, to completely fill the cavity 12A, 12B and hence seal the compound 14 within the tube 5.

Resistance to high differential pressure across the gland is provided by the LP epoxy plug 13 which prevents leakage of the gas-blocking compound under pressure. The purpose of the rubber sleeve 15 is to retain the compound 14 and provide a flexible membrane to allow for thermal expansion of the compound 14. The sole function of the epoxy plug 9 at the HP end is to provide a block at the fibre entry position to ensure that the injected compound 14 can only fill the tube 5. The assembled gland body is then inserted into the bulkhead B as shown in FIG. 4. A disc spring 16 is interposed between the shoulder 2 and a nut 17 which is screwed into a threaded bore B1 to drive the co-operating faces 2A, 2B towards each other and clamp the gasket 3B. Rubber O-ring seal 3A slides over the surface of the inner bore B2 of the bulkhead and seals to it.

Because the space between the fibres and the internal bore of the tube 5 is very small and the distance over the length of the gas blocking compound is comparatively large, we have found that the seal produced by compound 14 effectively resists the high-pressure differential between the high pressure side and the low pressure side of the assembly Furthermore because the tube 5 is "floating" within the body 1, being fixed only at the high pressure end in the counter-bore 8A of the end fitting 8, any temperature changes experienced by the gland in use will produce no significant stress on the fibres 6 within the assembly because the low pressure end of the tube 5 is free to slide within the body 1. This mechanism effectively takes up differential strains due to temperature changes in use of the gland.

Furthermore the tube 5 being electrically connected with an electrically-conductive high-pressure end fitting 8 and an electrically-conductive-low pressure end fitting 12 provides an electrical connection and enables e.g. power transfer to be made through the gland via the copper tube. Therefore where the repeater is powered from the cable the power can be transmitted via the tube in use of the gland.

The gland described is not designed as a primary water block where the tube 5 is being used as an electrical conductor and is intended for use as a secondary water block behind a primary water block such as the one described in the aforementioned patent 2058484.

Where however the gland is not required to provide an electrical path for e.g. power feed, then it would not be necessary for the body 1 to be electrically insulating.

Figure 5:
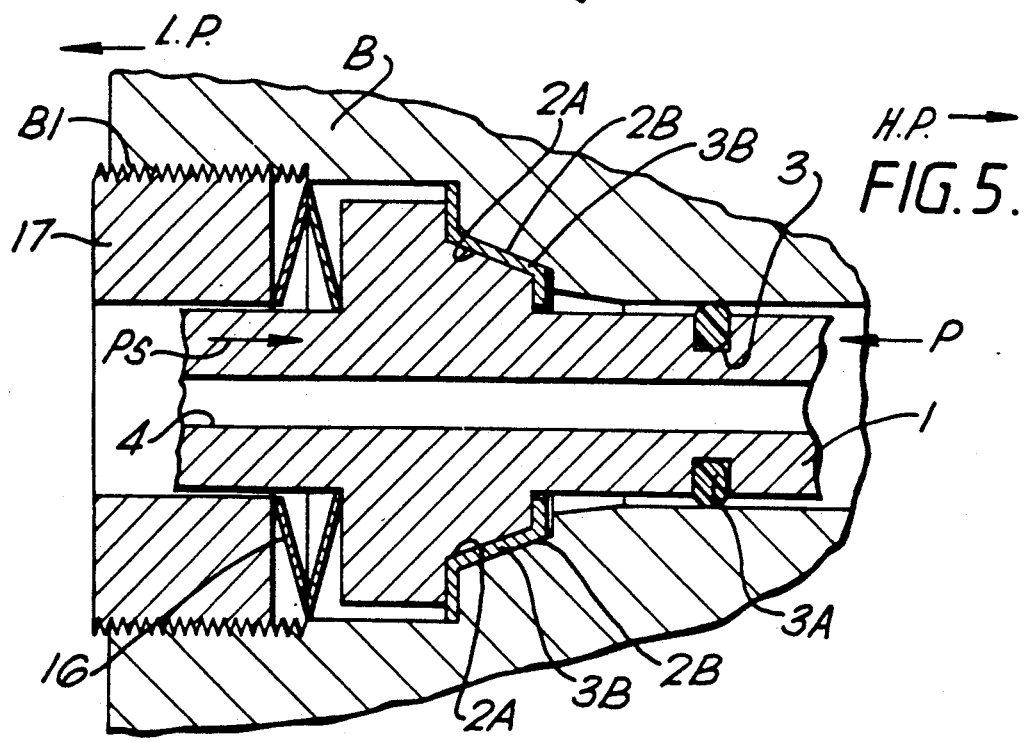
FIG. 5 shows yet another part of the embodiment of FIG. 2 on a larger scale.
Figure 6:
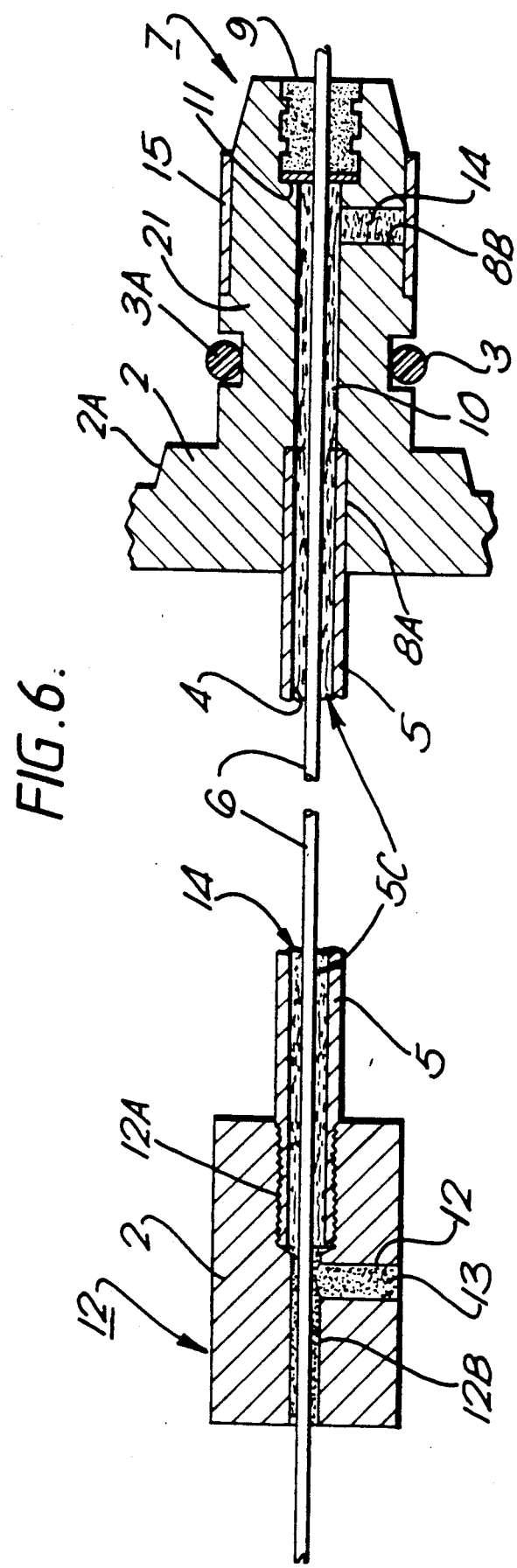
FIG. 6 shows a modification of FIG. 2 to 5 where electrical power feed through is not required.

Also the body 1 need not overlap very far the end portion of the tube 5 to which it is fitted. An embodiment providing no power feed through is illustrated in FIG. 5. Referring to FIG. 5 the gland is similar in all respects to the gland of FIGS. 1 to 4 except as follows. The body 21 of metal e.g. copper or stainless steel has the shoulder 2 but extends no further. Otherwise like reference numerals in FIG. 5 refer to like parts as in FIGS. 1 and 4. The high pressure end ring 7A is no longer required. The gasket 3B will be used but is not shown. The tube 8 is now not a separate part but an integral portion of body 1 and is so not referenced. The other spring component 16 and nut 17 are also not shown but would of course be required for securing the gland through a bulkhead.

In the embodiment described the acrylate-coated fibres have a diameter of 0.25 mm although with overcoating fibre of e.g. 0.65 mm could be contemplated.

The bore 5c of the tube 5 has a length substantially greater than its width and would normally be at least an order of magnitude greater. In the embodiments described the length of the passageway 5c is about 10 cms and the diameter about 5 mm which is between one and two orders of magnitude greater. However the embodiments described (including FIG. 7) have a designed leakage rate of not more than $1 \times 10^{-9}$ parts in 25 years of life at an ocean depth pressure of 83 Mega Pascals. Up to twelve fibres are envisaged gas blocked through a single gland.

A big advantage is the use of acrylate-coated fibres which are not stripped for use in the gland. Other coatings could however be used and the acrylate coating can be overcoated with a further plastics coating if desired, provided a gas-blocking coating is maintained.

The embodiments described are filled with the gas blocking material from one end, ie. the HP end before the hydraulic pressure resisting plug 13 at the LP end is formed, which means that the plug 13 is not independently testable to ensure its integrity. The embodiment of FIG. 7 provides for independent testing of the plug before completion of the gland with gas blocking material.

Figure 7:
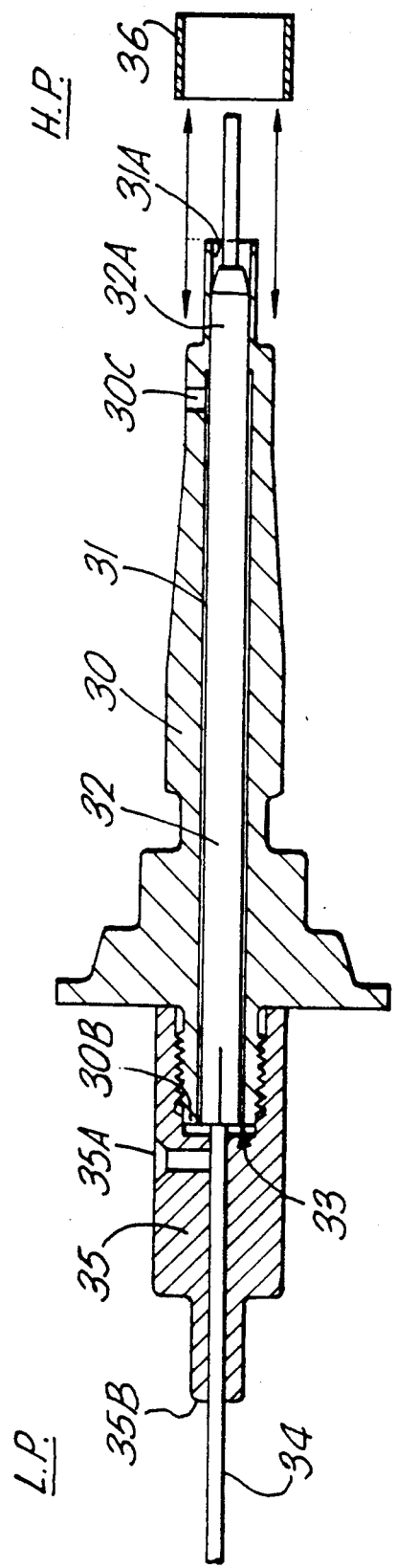
FIG. 7 shows another embodiment of the invention.

Referring to FIG. 7, a gland body 30 has a bore 31. A tube 32 fits concentrically into the body 30 so there is an annular space 33 between the outer surface of the tube 32 and the bore 31 of the body, except at the right hand end as viewed in FIG. 7 where the end portion 32A of tube 32 is an interference fit in a reduce diameter portion 31A of bore 31. The optical fibre 34 extends through the tube 32. A cap 35 is screwed onto a threaded end portion 30A of body 30 and an 0 ring is compressed against the end face 30B of body 30 and also seals against the fibre 34. Then resin is injected through port 35A until resin appears from the end 35B of cap 35, and the resin cured at room temperature. This forms the hydraulic pressure resisting plug of the gland and this can be tested with gas pressure from the high pressure end.

Then the gas blocking material (Hyvis-RTM) is injected through port 30C in body 30, which travels through the space 33 until it reaches two diametrically opposed slits 32B at the left hand end which allows the material to enter the bore of the tube 32 and travel back to the high pressure HP end.

A small length of heat shrink tubing (not shown) is applied over each end of the gland and the protruding fibre to provide a bend limiting device and a liquid seal for the gas blocking material. Prior to application of the tubing a metal sleeve 36 is applied over the port 30C to prevent leakage.

This design is intended in this embodiment for a single fibre and the length of the gas block is about 25 mm and the length of the resin block about 10 mm.

It is an important advantage in all embodiments that the fibre or fibres do not have to be stripped. The compatibility of the resin with the fibre coating is of course important.

In all the embodiments the hydraulic pressure resisting plug comprises an adhesive material which is bonded both to the coating of the or each fibre and to the wall of the passageway through which the fibres extend, and the integrity of the bond needs to be such as to prevent leakage of the gas blocking material but does not need to provide a gas blocking function. In general therefore the plug will always have a shorter length in the passageway than the gas blocking material in the passageway.

What is claimed is:

1. An hermetic gland for optical fibres comprising a rigid gas-tight member having a passageway from a high pressure end of the gland extending therethrough to a low pressure end of the gland, at least one optical fibre extending into the passageway at the high pressure end and emerging from the passageway at the low pressure end, a gas-blocking grease jelly or similarly viscous liquid material filling said passageway over such length as to provide the required gas blocking property in the passageway of the gland, and a plug in the passageway at the low pressure end whose purpose is to prevent leakage of said gas blocking material from the passageway and to provide the required hydraulic pressure-resisting property within said passageway of the gland.

2. A gland as claimed in claim 1, said member comprising a tube, and mounting means comprising a body sealed in gas-blocking manner to the tube.

3. A gland as claimed in claim 2, comprising a flexible seal at or near the high pressure end enabling expansion and contraction of the gas blocking material.

4. A gland as claimed in claim 2 wherein said tube is electrically conductive and said body is electrically insulating whereby to provide an electrically insulated electrical conductor through the gland.

5. A gland as claimed in claim 2, comprising a high-pressure-end fitting secured and sealed in gas-blocking manner to said body and to said tube at or near the high pressure end, there being a plug in the end fitting between the fitting and the fibres to secure the fibres thereto.

6. A gland as claimed in claim 2, said tube being sealed in liquid tight manner to the body at the high pressure end, there being a tubular space between the tube and the body and a liquid transfer port connecting said space with said passageway adjacent the low pressure end, there being a liquid injection port through the body adjacent the high pressure end and communicating with said space.

7. A gland as claimed in claim 1, wherein the hydraulic pressure resisting plug comprises an epoxy resin bonded to said at least one fibre and the wall of said passageway.

8. A gland as claimed in claim 1, wherein said at least one fibre has a protective coating throughout its length and said plug comprises a hardened adhesive bonded to said coating and to the wall of said passageway.

9. A gland as claimed in claim 1, comprising a low-pressure-end fitting secured to said member in liquid-tight manner and containing said plug which secures the fibres in the end fitting.

10. A submersible repeater for an underwater optical fibre telecommunication system, comprising a pressure-resistant housing, a primary pressure-resistant cable entry gland for an optical fibre submarine cable and a secondary optical fibre gas blocking gland, said gas blocking gland comprising a passageway through which the fibres extend and which has a length substantially greater than its width, said passageway containing a gas blocking grease jelly or similarly viscous liquid material over such a length in the passageway as to act as the gas block for the secondary gland.

* * * * *